Sept. 11, 1951 G. J. SIEZEN 2,567,655
SCREEN FOR TELEVISION PROJECTION
Filed Aug. 4, 1948 3 Sheets-Sheet 1
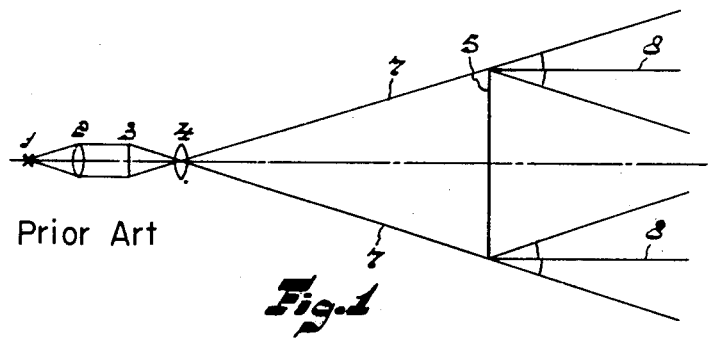
Prior Art Fig.1
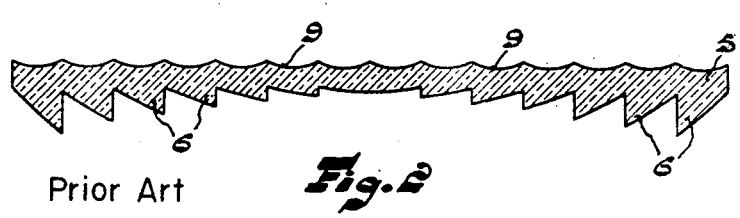
Prior Art Fig.2
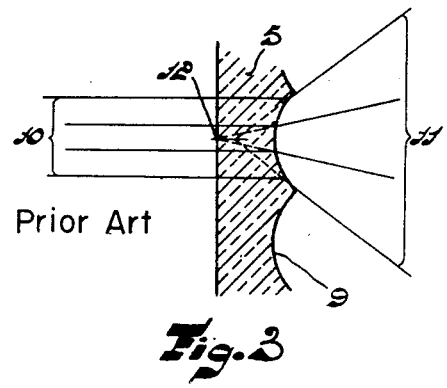
Prior Art Fig.3
GERRIT JAN SIEZEN
INVENTOR
BY
AGENT Sept. 11, 1951 G. J. SIEZEN 2,567,655
SCREEN FOR TELEVISION PROJECTION
Filed Aug. 4, 1948 3 Sheets-Sheet 2
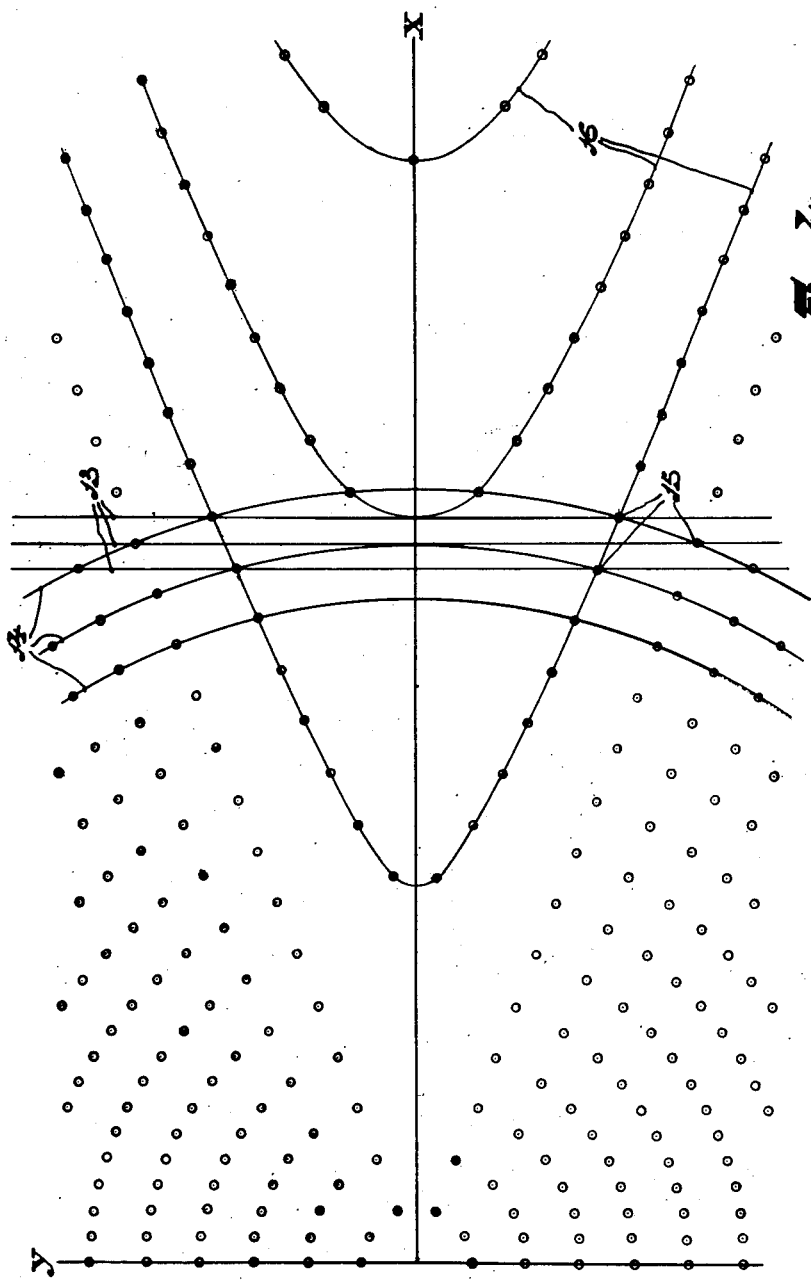
Prior Art
GERRIT JAN SIEZEN
INVENTOR
BY
AGENT Patented Sept. 11, 1951

2,567,655

UNITED STATES PATENT OFFICE 2,567,655

SCREEN FOR TELEVISION PROJECTION

Gerrit Jan Siezen, Eindhoven, Netherlands, assignor to Hartford National Bank and Trust Company, Hartford, Conn., as trustee Application August 4, 1948, Serial No. 42,377
In the Netherlands August 21, 1947

1 Claim. (Cl. 88—28.93)

This invention relates to a projection device having an area of image in which at least one raster of equidistant straight lines coincides with at least one raster of equidistant circular lines, more particularly a television receiver.

Applicant has found that with such projection devices circumstances may occur due to which anomalies appear in the image. Before describing the steps taken for avoiding the defects, these circumstances will be discussed with reference to the accompanying drawings, given by way of example.

Fig. 1 is a diagrammatic section of a known projection device, for example a film projector.

Fig. 2 is a section on enlarged scale of a known projection screen to be used with such a projection device.

Fig. 3 illustrates the path of a light beam through such a screen.

Fig. 4 illustrates the anomalies which may occur on such a screen.

Figure 5:
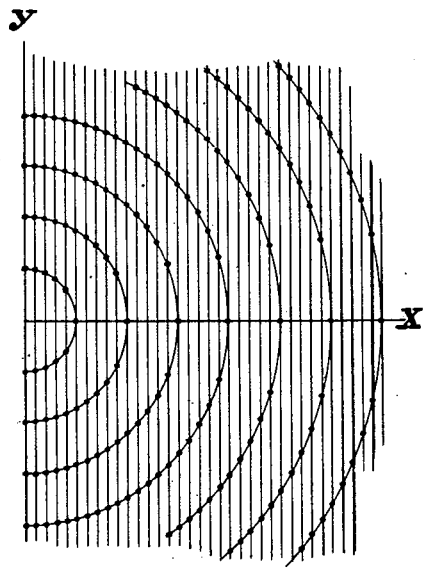
Figs. 5 and 6 are diagrams for use in explaining the invention.

The projection device comprises a source of light 1, a condenser 2, an object to be projected, for instance a film 3 and an object glass 4. The image is cast on a screen 5, in the present case a translucent screen.

At one side of such screens a so-called Fresnel surface is often formed i. e. provided with a raster or prismatic grooves with a gradually varying profilation, in the form of circles or an Archimedean spiral conferring the reflecting properties of a lens on the flat screen. In Fig. 2 these ribs are designated 6. Due to this Fresnel surface the light rays, for instance the rays 7, falling on the screen at the edge are diffused in a spatial angle of which the axes 8 are no longer in line with the rays 7, but of which these axes are bent together. As a result thereof the screen appears brighter to the observer.

It is not vital to the invention whether the circular lines forming the Fresnel surface are pure circles or form an Archimedean spiral.

It is known to provide the screen at the other side with a raster of straight grooves 9, sometimes two of such crossed rasters, in order to direct the light radiated by the screen, which would be lost in the auditorium far above and below the screen, more into the direction of the audience. By these means it is ensured that the space from which the image is clearly visible, becomes comparatively broad and low.

In the drawing the ribs 6 and the grooves 9 are greatly exaggerated. They are chosen to be so narrow as to be imperceptible when viewed at some distance from the screen. The width may, for instance, be of the order of 0.5 mm.

If an image is cast on such a screen the latter will not blink evenly. The raster of straight grooves exhibits alternating bright and dark lines, since, as appears from Fig. 3, a beam of parallel incident light rays 10 is so refracted as to form a diverging beam 11 and a virtual image 12. Since the groove is straight this image exhibits the form of a narrow band, the space between two bands being dark.

The Fresnel surface also exhibits dark lines due to the inactive parts constituting the transition of one rib into the other.

These lines exhibit the form of circles or of an Archimedean spiral. As has been pointed out, however, the grooves and ribs are too narrow so that the dark and bright lines also are so crowded that they are not troublesome in viewing the image projected.

Such a raster of straight lines is formed in a television image. The drawing does not represent a television receiver, but the path of the light rays therein appears from Fig. 1, if the source of light 1, the condenser 2 and the film 3 are replaced by a cathode-beam tube of which the screen is located at 3.

Applicant has found that if a raster of straight lines coincides with a raster of circles (or with a raster in the form of an Archimedean spiral which, owing to the small relative spacing of the lines, makes no difference in the present case) anomalies do occur in the image. These exhibit the form of definite figures, so-called Moiré figures, which are formed by lines that are much more spaced apart from each other than those of the circle raster or line raster.

Fig. 4 illustrates how these Moiré figures may be formed. It has been assumed that a raster having dark straight parallel lines 13 (of which only three are shown) coincides with another raster of equidistant dark circles 14 of which also only a few are shown. At the points of intersection of the dark lines, dark points or patches 15 are observed.

Owing to the small relative spacing of the lines the initial rasters are not perceived by the eye, but the eye arranges dark points involuntarily into lines which may be spaced much more widely apart, so that they may be annoying. Three of these lines are shown in the drawing and designated 16. It is clearly visible that the relative spacing of these lines 16 considerably exceeds the spacing of the lines of the initial rasters and furthermore that the spacing is a maximum where the straight lines of one raster are about tangent to the circles of the circle raster i. e. in the proximity of the X-axis. At a greater distance from the centre the Moiré figures are most troublesome, since the circles extend over a greater distance substantially parallel with the straight lines, and the losses of light are a maximum at the rims of the Fresnel lens.

The invention is based on the recognition that these Moiré figures do not appear to an annoying degree when providing that the spacing of the lines is very different.

According to the invention the relative spacing of the lines of one of rasters is at least five times as great as the relative spacing of the lines of another different raster. In the present case "different" is to be understood to mean that two rasters both exhibit either straight lines or circles.

It has, in effect, been found that the appearance of the Moiré figures may be a maximum when the relative spacing of the lines of different rasters is of the same order of magnitude, which is the case with most projection devices and screens, since this distance is chosen substantially in accordance with the resolving power of the eye. This has been described in detail in patent application Serial No. 41,361, filed July 29, 1948. If, however, the spacing is chosen to be very different, the Moiré figures will not appear, as will be shown by giving an example which is illustrated in Figures 5 and 6.

Fig. 5 represents diagrammatically the ordination curves of the dark patches formed upon coincidence of a circle raster and a raster of straight lines, the relative spacing of the circles being five times that of the straight lines.

Figure 6:
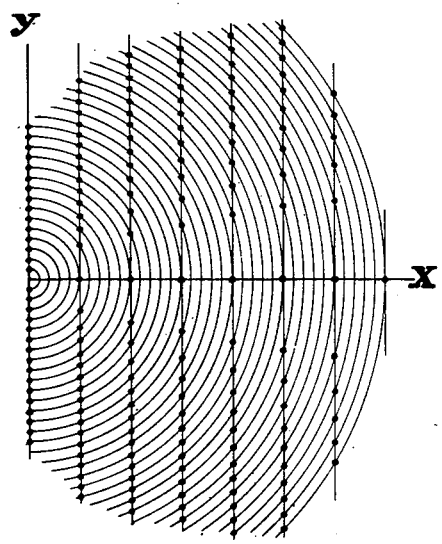

Figure 6 is similar to Fig. 5, but in Figure 6 the spacing of the circle is ⅕ of that of the straight lines.

If, however, the ratio of the relative spacing of circles and straight lines exceeds 5, it is found that if the relative spacing of the circles is greater, the rows of points of intersection will form circles (Fig. 5), whereas if the relative spacing of the straight lines is greater the rows will form straight lines.

The circles or straight lines thus formed are not troublesome, since their relative spacing is not greater than but equal to the relatives spacing of the circles or lines of one of the initial rasters. Since it may be assumed that the lines of these rasters per se were not visible to an annoying degree, the lines of points of the intersection will neither be so any longer.

In the schematic figures, notably in Figures 5 and 6, it was not possible clearly to indicate the situation near the X-axis. If a line of a circle raster is tangent to a straight line of the line raster an elongated, blurred patch instead of a dark point appears and such a patch is not very contributive to the formation of a Moiré figure.

In practice it has been found sufficient to make the ratio of the relative spacing larger than 5, it being immaterial, as regards the form of the Moiré figures, whether the spacing of the circles or that the straight lines is greater.

What I claim is:

A projection screen comprising a thin plate of light transmitting material, said plate having in one surface thereof a first series of circulating disposed grooves equidistantly spaced and forming a Fresnel surface, and in the other surface thereof a second series of straight grooves of concave cross-section equidistantly spaced, said first series of grooves being so spaced as to cause the formation of a circularly disposed raster of lines each spaced at a predetermined distance from adjacent lines, said second series of grooves being so spaced as to cause the formation of a parallel raster of lines each spaced a predetermined distance from adjacent lines, said equidistant spacing of said first series of grooves being of a relative value with respect to the equidistant spacing of said second series of grooves that the relative spacing of the raster of lines caused by one of said series of grooves is at least five times as great as the relative spacing of the raster of lines caused by the other of said series of grooves.

GERRIT JAN SIEZEN.

REFERENCES CITED

The following references are of record in the file of this patent:

UNITED STATES PATENTS

| Number | Name | Date |
| --- | --- | --- |
| 1,943,995 | Weld | Jan. 16, 1934 |
| 1,970,358 | Bull et al. | Aug. 14, 1934 |
| 2,258,164 | De Lassus | Oct. 7, 1941 |
| 2,268,351 | Tanaka | Dec. 30, 1941 |
| 2,351,033 | Gabor | June 13, 1944 |
| 2,351,034 | Gabor | June 13, 1944 |
| 2,419,216 | Hotchner | Apr. 22, 1947 |

FOREIGN PATENTS

| Number | Country | Date |
| --- | --- | --- |
| 831,451 | France | June 7, 1938 |